Figure 1:
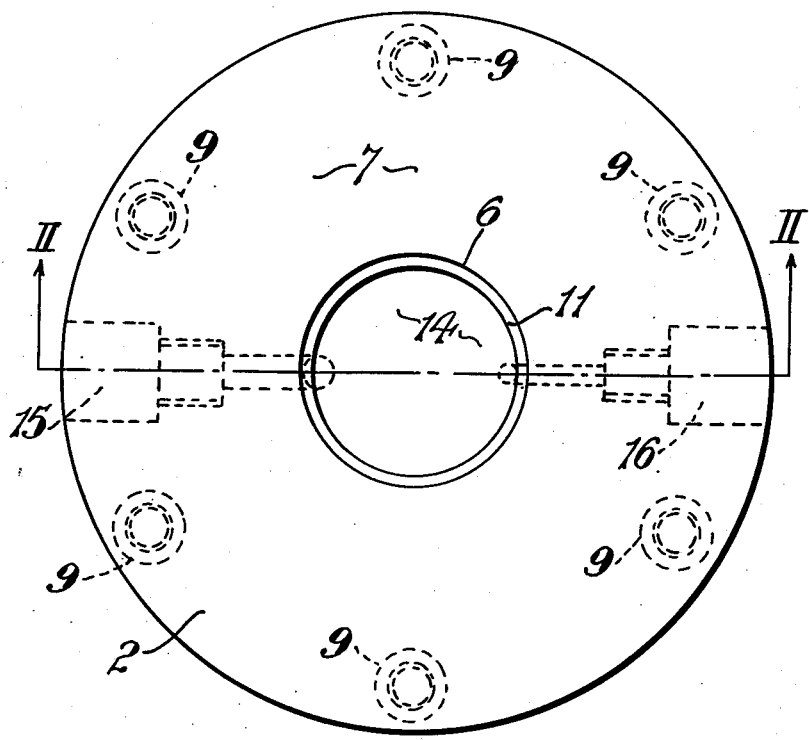

Oct. 20, 1953   P. BRIERLEY   2,655,943

HYDROSTATIC APPARATUS

Filed Oct. 16, 1951

INVENTOR.
Paul Brierley
BY Benj. T. Pauler
his attorney

UNITED STATES PATENT OFFICE 2,655,943

HYDROSTATIC APPARATUS

Paul Brierley, Birmingham, England, assignor to Dunlop Rubber Company Limited, London County, England, a British company Application October 16, 1951, Serial No. 251,595
In Great Britain October 19, 1950

3 Claims. (Cl. 137—778)

This invention relates to hydrostatic apparatus, particularly apparatus for indicating forces, e. g. weights of objects, on a pressure gauge connected to a deformable fluid-container on which the forces act.

Weighing apparatus of the above type is known which comprises a metal cylinder rigidly closed at one end by a base plate bolted thereto, the other end being sealed by a coaxial circular load plate resiliently secured within the bore of the cylinder at that end by a rubber annulus bonded at its outer circumference to the bore of the cylinder and at its inner circumference to the circumference of the load plate. A sealing ring is interposed between the base plate and the adjacent end of the cylinder to ensure a leaktight joint and the chamber between the base plate and the load plate is connected to a pressure gauge. When a weight is supported on the load plate, the resilient deformability of the annulus by which the plate is attached to the cylinder allows slight deflection of the load plate towards the base plate. Thus, when the chamber is filled with liquid a weight on the load plate pressurizes the liquid so that the pressure gauge reading gives a proportional indication of the weight.

In a weighing machine of the type described above, should it be necessary to replace any of the bonded components, i. e. the cylinder, the rubber annulus or the load plate, either a complete new bonded assembly will be required or else the annulus must be stripped from between the cylinder and the load plate and a new annulus bonded in place. In either case the cost of replacement of any of the bonded parts will be excessive compared with the actual cost of the replaced component.

It is an object of the present invention, therefore, to provide hydrostatic load-indicating apparatus of the type comprising a liquid container rigidly closed at one end, the other end being closed by a load plate secured to the container by a rubber annulus fitting betweeen the circumference of the plate and the inner wall of the container, wherein the need for bonding the annulus to the plate and container is obviated, thus simplifying the construction and greatly facilitating maintenance replacements.

According to the invention a hydrostatic load indicating device incorporating a displaceable load plate comprises a rigid body having a base member and a cover plate each containing a frusto-conical recess secured together with the recesses coaxial and their major diameters in the parting plane to form a chamber having a V-shaped periphery, said cover plate having an orifice exposing the load plate, a floating load plate having a V-shaped periphery located in the chamber by a resilient annulus compressed between the V-shaped peripheries of the chamber and plate and forming a liquid-tight chamber with the base member, means for introducing liquid into said chamber and means for connecting the chamber to a pressure gauge.

Figure 2:
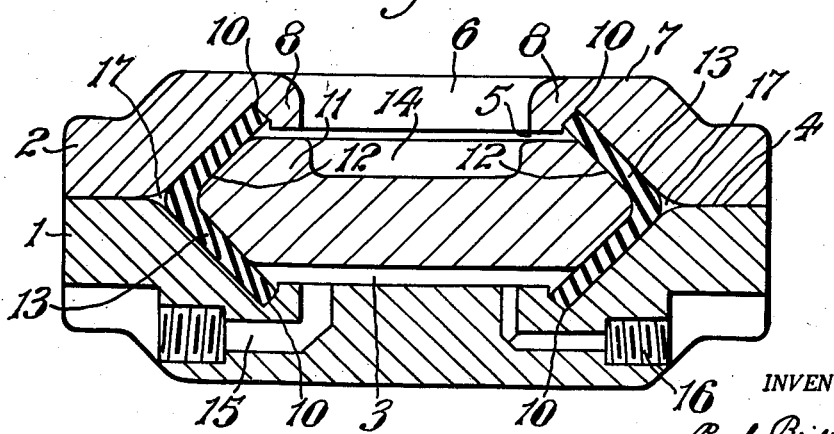

The apparatus will now be more particularly described with reference to the accompanying drawings wherein Fig. 1 shows a plan view of a hydrostatic weighing machine in accordance with the invention, and Fig. 2 shows a cross section of the machine on the line II—II in Fig. 1.

The machine comprises a metal body consisting of a base member and an annular cover plate 2. The base member is substantially cylindrical in form having a frusto-conical cavity 3 therein coaxial with the axis of the cylinder, the major diameter of the cavity coinciding with one transverse face 4 of the base member. The cover plate 2 is also of basically cylindrical form having a frusto-conical cavity 5 therein coaxial with the cavity in the base member, the major diameter of the cavity coinciding with a transverse face of the cover plate and being equal to the major diameter of the cavity 3 in the base member. The cavity in the cover plate is not as deep as the cavity in the base member, and a large circular hole 6 is formed between the minor diameter of the cavity in the cover plate and the adjacent transverse face 7 thereof to leave a radially inwardly extending annular flange 8 at the minor diameter end of the cavity and coaxial therewith.

A number of evenly spaced tapped blind holes 9 are provided in the cover plate 2, normal to the transverse faces thereof and having centres on a pitch circle concentric with but lying well outside the cavity. Corresponding bolt clearance holes (not shown) are formed in the base member, each hole being counter-bored on the side remote from the major diameter end of the cavity.

The apparatus further comprises a circular load plate 11 having a V-shaped edge 12, i. e. the plate is in the form of a pair of conical frusta having their bases coincident. A rubber annulus 13 having an internal diameter somewhat smaller than the minor diameter of the load plate is stretched to fit around the circumference of the plate with the transverse edges of the annulus equally over-lapping the transverse faces of the load plate.

The load plate, with the annulus fitted thereon, is located coaxially within the mouth of the cavity in the base member to extend partway thereinto and leave a chamber between the base of the cavity and the adjacent face of the load plate. The apex of the V-edge on the load plate is substantially co-planar with the cavitied face 4 of the base member, i. e. half the load plate projects beyond the said face. The cover plate is fitted to the base member by sockethead bolts passing through the holes in the base member to engage with the tapped holes 9 in the cover plate, the projecting half of the load plate fitting into the cavity in the cover plate. Annular recesses 10 are formed adjacent the circumference of the minor diameters of the cavities 3, 5 to centralise the annulus 13 and a clearance space is left between the flange 8 of the cover plate and the adjacent upper face of the load plate to ensure that the latter is free to move axially. A circular recess 14 is formed in the upper face of the load plate to accommodate an applied load or weight. A radial hole 15 is drilled between the outer circumference of the base member and the chamber in the body, the hole being tapped for a pipe connection to a pressure gauge (not shown). A further tapped hole 16 is provided between the outer circumference of the base member and the chamber. This second hole may be connected to a reservoir or other means for filling the chamber with liquid after which it is closed e. g. by means of a screwed plug.

In operation the chamber is connected to a pressure gauge and filled with liquid, e. g. vegetable oil of suitable viscosity, and the hole 16 is then closed. The load which is to be determined is applied to the load plate through the hole in the cover plate, thus pressurising the liquid to cause a deflection of the needle on the pressure gauge. The actual value of the applied load can then be calculated. Alternatively, the scale of the pressure gauge may be calibrated to read directly the magnitude of an applied load.

Preferably the major diameter ends of the cavities in both the base member and the cover plate have radiused edges so that when assembled a circumferential groove 17 is formed at the joint between the base member and the cover plate. When the load plate is under load and the liquid is pressurized the rubber annulus is deformed and flows into the grooves. The rubber thus forced into the groove provides a seal at the joint and prevents any escape of liquid between the cover plate and the base member.

The flange on the cover plate, extending as it does over the transverse end of the associated face of the load plate remote from the base member, obviates any tendency for the annulus to be forced out from between the load plate and cover plate as pressure rises in the liquid under load.

Instead of fitting a pressure gauge to a body unit as described, a single pressure gauge may be connected to several units used in conjunction as, for example, when supporting a large weighing platform or a large multi-point load such as an aircraft.

Natural rubber may be used for the annulus when the liquid in the chamber is to be a vegetable oil. Alternatively the annulus may be made from a synthetic rubber such as a copolymer of butadiene and acrylonitrile in which case a suitable mineral oil may be employed.

The apparatus according to the invention is easy to assemble and when maintenance is required any single component may be replaced without the necessity of scrapping or reclaiming other sound parts which is often necessary in the case of a bonded assembly.

The rubber annulus prevents leakage at the joint in the body, thus obviating the need for a body seal in addition to a supporting annulus.

Having described my invention, what I claim is:

1. A hydrostatic load indicating device comprising a base member having an inwardly tapering frusto-conical recess, a cover plate having a complementary recess and an orifice between said complementary recess and the exterior of said cover plate, said members and said plate being secured together with the said recesses coaxial to form a chamber having a V-shaped peripheral wall, a floating load plate having a V-shaped periphery in the chamber, a resilient annular shaped member between the V-shaped periphery of said load plate and the V-shaped peripheral wall of said chamber to form a liquid-tight compartment between the load plate and the base member, a fluid inlet within said base member for said compartment and a fluid outlet within said base member for connecting said compartment to a pressure gauge.

2. A hydrostatic load indicating device comprising a base member having an inwardly tapering frusto-conical recess, a cover plate having a complementary recess and an orifice between said complementary recess and the exterior of said cover plate, said member and said plate being secured together with the said recesses coaxial to form a chamber having a V-shaped peripheral wall, a circumferential groove formed in the said peripheral wall between adjacent circumferential portions of said recesses, a floating load plate having a V-shaped periphery located in the chamber, a resilient annular shaped member between the V-shaped periphery of said load plate and the V-shaped peripheral wall of said chamber to form a liquid-tight compartment between the load plate and the base member, a fluid inlet within said base member for said compartment and a fluid outlet within said base member for connecting said compartment to a pressure gauge.

3. A hydrostatic load indicating device according to claim 2 wherein the recesses of the base member and the cover plate are each provided with an annular lip to locate the resilient annulus and prevent axial movement thereof.

PAUL BRIERLEY.

References Cited in the file of this patent

UNITED STATES PATENTS

| Number | Name | Date |
|--------|------|------|
| 1,999,675 | White | Apr. 30, 1935 |
| 2,277,925 | MacClatchie et al. | Mar. 31, 1942 |